May 3, 1927.
A. S. MARTIN
1,627,102
KNEE OPERATED THROTTLE VALVE CONTROLLING MEANS
Filed Jan. 18 1927
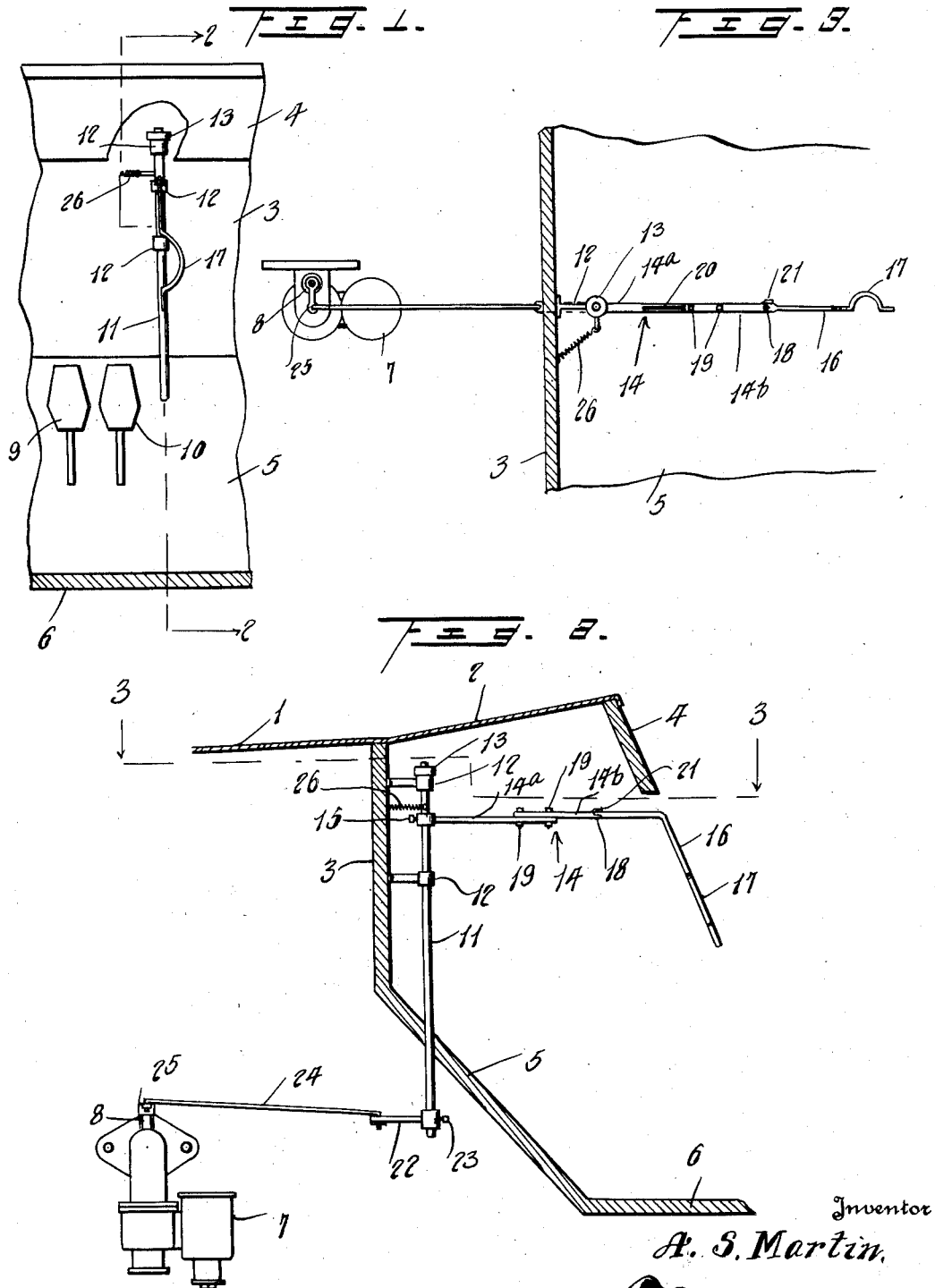
Inventor
A. S. Martin,
By
Attorney Patented May 3, 1927.

1,627,102

UNITED STATES PATENT OFFICE.

ANTONIO S. MARTIN, OF SCHENECTADY, NEW YORK.

KNEE-OPERATED THROTTLE-VALVE-CONTROLLING MEANS.

Application filed January 18, 1927. Serial No. 161,850.

This invention relates to automobiles and more particularly to the means by which the throttle valves of the engines of such vehicles are operated in controlling the speed of the engine.

The invention has for one of its objects to provide novel and simple means through the medium of which the throttle valve of the engine of an automobile may be controlled by the knee, whereby to permit one foot of the operator to remain on the clutch pedal and the other on the brake pedal.

With the foregoing and other objects in view, the nature of which will become apparent as the decription proceeds, the invention consists of the novel construction, combination and arrangement of parts hereinafter fully described and claimed, and illustrated in the accompanying drawing, wherein:

Figure 1 is a view illustrating the application of the knee operated throttle valve controlling means, Figure 2 is a sectional view taken on the vertical planes indicated by the lines 2—2 of Figure 1, and Figure 3 is a sectional view taken on the horizontal planes indicated by the line 3—3 of Figure 2.

Referring to the drawing by reference numerals, 1 designates the engine hood, 2 the cowl, 3 the dash, 4 the instrument board, 5 the toe board and 6 the front floor board of an automobile. 7 designates the carburetor and 8 the throttle valve of the engine of the automobile, and 9 designates the clutch pedal and 10 the brake pedal of the automobile.

The knee operated throttle valve controlling means comprises a vertical shaft 11 which is journaled in bearings 12 secured to the rear side of the dash 3 and which is supported in said bearings by a collar 13. An arm 14 is secured to the shaft 11 by a set screw 15. The arm 14 extends rearwardly from and may be adjusted vertically with respect to the shaft 11. A downwardly and rearwardly inclined arm 16, which is provided near its lower end with an arcuate portion 17 for the reception of the right knee of the driver of the automobile, is connected as at 18 to the rear end of the arm 14. The knee receiving portion 17 extends from the right side of the arm 16, and is so positioned with respect to the brake pedal 10 that the driver may comfortably maintain his knee therein while his foot is resting on said pedal. The arm 14 is of sectional formation, and the sections $14^a$ and $14^b$ thereof are connected together by bolts 19 which are fixed to the section $14^b$ and pass through a slot 20 in the section $14^a$. The sections $14^a$ and $14^b$ are thus connected together to permit the effective length of the arm 14 to be varied, and this adjustability of this arm permits the arm 16 to be moved forwardly and rearwardly to adapt the device for use by persons of different sizes. The connection 18 between the arms 14 and 16 is a pivotal one to permit the arm 16 to be swung forwardly beyond the instrument board 4 when the device is not to be used. The arm 14 is provided with a stop 21 with which the arm 16 contacts when in position for use. The stop 21 holds the arm 16 against any movement to the right with repect to the arm 14 when the arm 16 is in position for use. An arm 22 is secured by a set screw 23 to the lower end of the shaft 11, and is connected by means of a link 24 to an arm 25 fixed to the spindle of the throttle valve 8.

The connection between the throttle valve 8 and the arm 16 is such that when the latter is rocked to the right the throttle valve is moved in the direction of its fully opened position. A spring 26 secured to the dash 3 and shaft 11 rocks the shaft in the opposite direction when the pressure on the arm 16 is removed, with the result that the throttle valve 8 will be moved in the direction of its closed or engine idling position.

At the present time the throttle valve 8 is under the control of an accelerator pedal, not shown, which is positioned to be engaged by the right foot of the driver and the control of which necessitates the keeping of said foot off of the brake pedal 10. My device takes the place of the accelerator pedal, and due thereto enables the operator to keep his right foot on the brake pedal 10, with the result that the automobile may be brought to a quick stop and the possibility of accelerating the speed of the automobile when it is wished to bring it to a stop is obviated.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. Knee operated means for the throttle valve of an automobile, comprising a vertical shaft, an arm secured to the shaft, means connecting the arm to the throttle valve, a downwardly and rearwardly inclined arm secured to the shaft, and a spring secured to the automobile and shaft.

2. Knee operated means for the throttle valve of an automobile, comprising a vertical shaft positioned forwardly of the instrument board of the automobile, an arm secured to the shaft, means connecting the arm to the throttle valve, a second arm secured to and extending rearwardly from the shaft, and a third arm extending rearwardly and downwardly from the second arm and provided with an arcuate knee receiving portion, and a spring secured to the automobile and shaft.

3. Knee operated means for the throttle valve of an automobile, comprising a vertical shaft, an arm secured to the shaft, means connecting the arm to the throttle valve, a second arm adapted to be engaged by the knee of the driver, and means securing the second arm to the shaft for vertical adjustment with respect thereto.

4. Knee operated means for the throttle valve of an automobile, comprising a vertical shaft, an arm secured to the shaft, means connecting the arm to the throttle valve, a second arm adapted to be engaged by the knee of the driver, and means securing the second arm to the shaft for vertical and horizontal adjustment with respect thereto.

5. Knee operated means for the throttle valve of an automobile, comprising a shaft, means connecting the shaft to the throttle valve, an arm adjustable as to length and secured to the shaft, and a second arm adapted to be engaged by the knee of the driver and secured to said first arm.

6. Knee operated means for the throttle valve of an automobile, comprising a shaft, means connecting the shaft to the throttle valve, an arm secured to the shaft and adjustable as to length, a second arm adapted to be engaged by the knee of the driver and pivoted to said first arm, and means adapted to limit the movement of said second arm in one direction with respect to said first arm.

7. Knee operated means for the throttle valve of an automobile, comprising a shaft, means connecting the shaft to the throttle valve, an arm adapted to be engaged by the knee of the driver, and means for securing the arm to the shaft for adjustment with respect thereto in two directions.

8. Knee operated means for the throttle valve of an automobile, comprising a shaft, means connecting the shaft to the throttle valve, an arm adapted to be engaged by the knee of the driver, and means securing the arm to the shaft for forward and rearward adjustment.

9. Knee operated means for the throttle valve of an automobile, comprising a shaft, means connecting the shaft to the throttle valve, an arm adapted to be engaged by the knee of the driver, and means securing the arm to the shaft for forward and rearward adjustment and for movement into and out of operative position.

In testimony whereof I affix my signature.

ANTONIO S. MARTIN.